(12) United States Patent
Harter

(10) Patent No.: US 9,573,280 B2
(45) Date of Patent: Feb. 21, 2017

(54) VACUUM GRIPPER WITH A REPLACEABLE FILM

(71) Applicant: J. Schmalz GmbH, Glatten (DE)

(72) Inventor: Leonhard Harter, Loβburg (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 14/763,427

(22) PCT Filed: Jan. 21, 2014

(86) PCT No.: PCT/EP2014/051087
§ 371 (c)(1),
(2) Date: Jul. 24, 2015

(87) PCT Pub. No.: WO2014/114619
PCT Pub. Date: Jul. 31, 2014

(65) Prior Publication Data
US 2016/0067867 A1    Mar. 10, 2016

(30) Foreign Application Priority Data

Jan. 25, 2013  (DE) .................. 10 2013 201 247

(51) Int. Cl.
*B66C 1/02* (2006.01)
*B25J 15/06* (2006.01)
*B65G 47/91* (2006.01)

(52) U.S. Cl.
CPC ......... *B25J 15/0616* (2013.01); *B25J 15/0625* (2013.01); *B25J 15/0691* (2013.01); *B65G 47/91* (2013.01)

(58) Field of Classification Search
CPC .................................................. B25J 15/0616
(Continued)

(56) References Cited

U.S. PATENT DOCUMENTS 2,572,640 A * 10/1951 Lovegrove ............. G03B 27/60
                                                137/556
3,643,992 A *  2/1972 Jacobucci ............. B66C 1/0281
                                                294/188
(Continued)

FOREIGN PATENT DOCUMENTS

DE    3047717 A1    7/1982
DE     209424 A1    5/1984
(Continued)

OTHER PUBLICATIONS

International Search Report and Written Opinion of the International Searching Authority for PCT International Application No. PCT/EP2014/051087 mailed May 16, 2014.
(Continued)

*Primary Examiner* — Paul T Chin
(74) *Attorney, Agent, or Firm* — Howard & Howard Attorneys PLLC

(57) ABSTRACT

The invention relates to a surface area vacuum gripper for sucking and handling workpieces, comprising a housing, in which a negative pressure chamber is provided that can be subjected to negative pressure and wherein the housing comprises on the suction side, facing the workpiece, suction openings having a suction cross-section, wherein a flexible lining is associated to this suction side, which is applied to the workpiece. A film is interposed between the suction side of the housing and the flexible lining. The film includes flow openings which are locally corresponding to the suction openings, wherein the flow resistance of the suction openings is adjustable via the flow cross-section of the flow openings of the film.

13 Claims, 1 Drawing Sheet

(58) Field of Classification Search
USPC ....... 294/183, 187, 64.2, 64.3, 185, 188, 65; 901/40; 29/473; 414/752.1, 743, 737; 269/21
See application file for complete search history.

(56) References Cited

U.S. PATENT DOCUMENTS

| | | | | |
|---|---|---|---|---|
| 3,716,307 | A | * | 2/1973 | Hansen ................ B66C 1/0218 248/362 |
| 4,049,484 | A | * | 9/1977 | Priest ........................ B44C 1/16 156/285 |
| 4,674,785 | A | | 6/1987 | Riesenberg |
| 4,787,662 | A | * | 11/1988 | Dewez .................. B65G 47/91 294/65 |
| 4,850,780 | A | * | 7/1989 | Safabakhsh ....... H01L 21/67132 156/765 |
| 4,881,770 | A | | 11/1989 | Marzinotto et al. |
| 4,892,296 | A | * | 1/1990 | Jelinek .................. B25B 11/005 269/21 |
| 5,277,468 | A | * | 1/1994 | Blatt .................... B65G 47/911 294/64.2 |
| 5,492,566 | A | * | 2/1996 | Sumnitsch .......... H01L 21/6838 118/500 |
| 5,549,726 | A | * | 8/1996 | Petitcollin ........... C03B 23/0357 294/64.2 |
| 5,749,614 | A | | 5/1998 | Reid et al. |
| 5,967,577 | A | * | 10/1999 | Bhandarkar ........ H01L 21/4853 221/278 |
| 6,352,189 | B1 | * | 3/2002 | Kobayashi ........... B23K 3/0623 228/246 |
| 8,251,422 | B2 | * | 8/2012 | Cheng ............... H01L 21/67333 294/183 |
| 8,534,730 | B2 | * | 9/2013 | Strohmayr ............ B66C 1/0218 294/185 |
| 8,960,749 | B2 | * | 2/2015 | Fukano .................. B65G 47/91 294/188 |
| 2003/0164620 | A1 | | 9/2003 | Schmalz et al. |
| 2009/0273199 | A1 | * | 11/2009 | Joguet ................. B25J 15/0616 294/188 |

FOREIGN PATENT DOCUMENTS

| | | |
|---|---|---|
| DE | 3728286 A1 | 3/1989 |
| DE | 29512750 U1 | 5/1996 |
| DE | 19646186 A1 | 5/1997 |
| DE | 10009108 A1 | 9/2001 |
| DE | 102004016637 A1 | 10/2005 |
| DE | 102006012895 A1 | 9/2007 |
| DE | 102006050970 B4 | 6/2010 |
| DE | 2012000627 U1 | 3/2012 |
| EP | 0267874 A1 | 5/1988 |
| EP | 1083032 A1 | 3/2001 |
| EP | 2014587 A2 | 1/2009 |
| WO | 83/04384 A1 | 12/1983 |

OTHER PUBLICATIONS

German Examination Report issued in German Patent Application No. 10 2013 201 247.0 on Jun. 28, 2013.

* cited by examiner

VACUUM GRIPPER WITH A REPLACEABLE FILM

CROSS-REFERENCE TO RELATED APPLICATIONS

The present application is a National Stage of International Patent Application No. PCT/EP2014/051087, filed on Jan. 21, 2014, which claims priority to and all the benefits of German Patent Application No. 10 2013 201 247.0, filed on Jan. 25, 2013, both of which are hereby expressly incorporated herein by reference in their entirety.

BACKGROUND OF THE INVENTION

1. Field of the Invention

The invention relates to a surface area vacuum gripper for suctioning and manipulating workpieces, including a housing having a vacuum chamber that can be subjected to a vacuum. The housing has suction openings on its suction surface facing the workpiece, having a suction cross-section, wherein a flexible lining is allocated to this suction surface, which is placed on the workpiece.

2. Description of the Related Art

Surface area vacuum grippers of this type serve, in particular, for gripping and lifting objects by layers, such as flat materials that can be stacked in layers, e.g. boards or sheets, or smaller objects, e.g. cans, cups, bowls or suchlike. The surface area vacuum gripper has a flexible lining, which is normally placed on the upper surface of the object that is to be gripped. A foam rubber lining has proven to be advantageous, because this material adapts well to potentially uneven surfaces. There is still, nevertheless, the problem that different objects have different surfaces, and there may also be large gaps between the objects. In particular food cans or drink cans have an edge that protrudes upward. The available suction surface area is reduced because of this edge, as a result of which, a lifting of the object can only be implemented with an increased suction force. It is further problematic when different objects are to be gripped that have different heights, edges extending axially, or other contours such as pull tabs on cans.

The flow behavior of the surface area vacuum gripper must thus be adjusted precisely to the object that is to be gripped. For this reason, the foam rubber lining in conventional surface area vacuum grippers is provided with a cover layer having suction openings, the flow cross-sections of which are adapted precisely to the object that is to be gripped. One example of a surface area vacuum gripper is disclosed in published German Application No. DE 10 2006 050 970 A1.

With other surface area vacuum grippers, the suction openings are provided with flow control valves, which close those openings that are not occupied, such that the flow losses can be kept low.

If a surface area vacuum gripper is to be used for other objects after completing a work process, this gripper must be adjusted for each change to the other objects in that the flow cross-sections and/or the flow resistances must be changed, or flow control valves must be added or removed. This not only takes time, but is also cumbersome and may lead to malfunctions.

Another example of a surface area vacuum gripper is disclosed in published German Application No. DE 10 2006 012 895 A1, which has a suction plate having numerous suction openings, which can be modified or adjusted by a slider mounted on the interior of the housing. In this representative example, however, the housing must be opened, which may not be desirable, or may not be possible, e.g., due to a lack of tools. Other examples of surface area vacuum grippers having a layered type construction of numerous flat components, such as suction plates and hole templates, are generally disclosed in published U.S. Application No. US 2003/0164620 A1, published German Application Nos. DE 100 09 108 A1, DE 196 46 186 A1, published European Application No. EP 0 267 874 A1, published German Application Nos. DE 30 47 717 A1, and DE 20 2012 000627 U1.

SUMMARY OF THE INVENTION

The present invention thus addresses the object of further developing, in this respect, a surface area vacuum gripper of the type specified in the introduction, such that it can be retooled for other objects within the shortest possible time period.

This object is achieved according to the invention with a surface area vacuum gripper wherein an intermediate layer, e.g. a film, is inserted between the suction side of the housing and the flexible lining, and the film has flow openings corresponding spatially to the suction openings, wherein the overall flow resistance at the suction openings and the flow openings can be adjusted, varied or determined via the flow cross-section of the flow openings in the film.

With the surface area vacuum gripper according to the invention, the vacuum gripper is adjusted to the demands for the object that is to be gripped by a film, located between the housing and the flexible lining. Thus, the base of the housing no longer needs to be removed and replaced with a base having different suction openings, which have a larger or smaller opening cross-section, as was previously the case, but instead, the base of the housing is lined with a film, which, for its part, defines the size of the flow cross-section corresponding to the objects. The replacement of the film is substantially easier than exchanging the entire base. The housing need not be opened, and no tools are required.

In another embodiment of the invention, the suction opening and the flow opening are located such that they are coaxial to one another. Normally the opening cross-section of the suction opening on the base of the housing has a larger cross-section area than the opening cross-section of the flow opening, such that the air quantity can be controlled by the flow opening in the film. With another embodiment, however, there is also the possibility that the clear cross-section can be modified to the desired size by offsetting the two openings to greater or lesser extents.

In still another embodiment, it is provided that the flow opening has a cross-section that is not circular. This can be rectangular, triangular, clover-leaf shaped, elliptical, or any other suitable shape.

In yet another variation, the suction opening on the housing and/or the flow opening on the film each have a circular cross-section. The circular cross-section has the substantial advantage that it has defined and known flow behaviors, and can be easily produced.

In another embodiment of the invention, a valve body, in particular a valve ball, a vane body, a membrane valve, or suchlike, of a flow control valve, is disposed in the suction opening of the housing, and the film forms a portion of the flow valve. The suction opening is designed to be large enough that the valve body can be placed in this opening, or through this opening, prior to applying the film thereto, such that it is retained in the suction opening by this film, after the film has been applied. The valve body thus moves behind the film and can close, entirely or partially, a valve opening provided behind the suction opening.

Various embodiments of the invention provide that the film is glued to the housing, or is attached thereto adhesively, mechanically, or magnetically, or that the film is attached to the housing such that it can be displaced and/or rotated. Glued films are conceived as disposable articles for single use, and can have a relatively simple design. They can, for example, be torn off from a supply roll and cut to the desired length. Mechanically or magnetically attached films are placed in a clamping device provided on the housing, and secured thereto, if applicable, with the clamping device. They can be used repeatedly, and are labeled for organizational purposes. With films that are moveably attached, the clear flow cross section through the housing base and the film can advantageously be reduced and adjusted precisely to the object that is to be gripped.

The film can, as a rule, have a single layer design. It is advantageous, however, in a preferred exemplary embodiment, that the film have two, or multiple, layers, and includes a functional layer and an attachment layer. The functional layer has the defined flow openings, while the attachment layer serves to attach the film to the housing, e.g. by use of adhesive or clamping. When using an adhesive, the attachment layer is composed of an adhesive layer, which is applied such that it has a sufficiently large spacing to the flow cross-section, such that it does not extend into the open flow cross-section. The attachment layer also has interruptions corresponding to the flow openings, such that the flow openings lie in the clear openings thereof.

In one exemplary embodiment, the functional layer is composed of an air-permeable material, e.g. an open-porous or open-celled foam rubber, e.g. polyurethane foam. The functional layer functions thereby as a resistance layer. The functional layer can also be composed of a closed-cell material, e.g. foam rubber that is pinned.

Because the attachment layer has interruptions, but the functional layer has no discrete openings, the air is suctioned in the regions of the interruptions in the attachment layer.

In another variation, the film or the functional layer has flow openings, with an elastic tongue located in the flow cross-section thereof. This tongue extends into the flow opening and is made from the same material as the functional layer. When the flow openings are being formed, one ligament is left in place, such that the tongue is formed from the interior of the flow opening. When the air flow is stronger, the tongue bends toward the direction of flow, and rests against the suction opening in the base, and functions as a valve platelet.

In one embodiment, the entire film, or at least one layer thereof, is composed of metal, a fiber composite, ceramic, glass or plastic. In particular, the layer made of metal or plastic has the defined flow openings, while the other layer is the attachment layer, for example.

As stated above, the film can be designed as a quickly replaceable film, and can preferably have positioning aids for obtaining a precise positioning on the housing. These positioning aids can be, e.g., receiving holes for centering pins provided on the housing.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
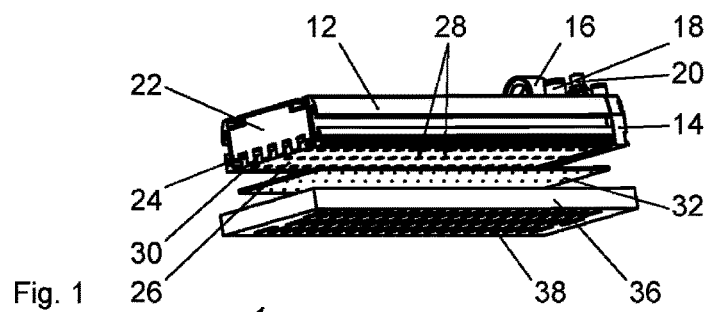
FIG. 1 is a perspective view of the surface area vacuum gripper according to the invention.

A perspective view of a surface area vacuum gripper 10 is depicted in FIG. 1, having a housing 12, which, e.g., is a section of an extruder profile. Alternatively, the housing 12 can also be a sheet metal element, a 3D printer element, a cast element, a carbon fiber reinforced plastic element, a milled element, or a welded element. The housing 12 is closed at the ends with two (not shown) end caps. A manometer 16, a pressurized air connection 18 and other connections 20 can be discerned on one end cap, which are not essential to the invention. And insertion element 22 is located in the housing 12, which reduces the free interior space of the housing 12, and has grooves 24 on its undersurface. Corresponding to these grooves 24, the housing 12 has numerous rows having suction openings on its base 26. Furthermore, it can be seen that the base 26 is encompassed by an edge 30, which rises slightly from the base 26.

Figure 2:
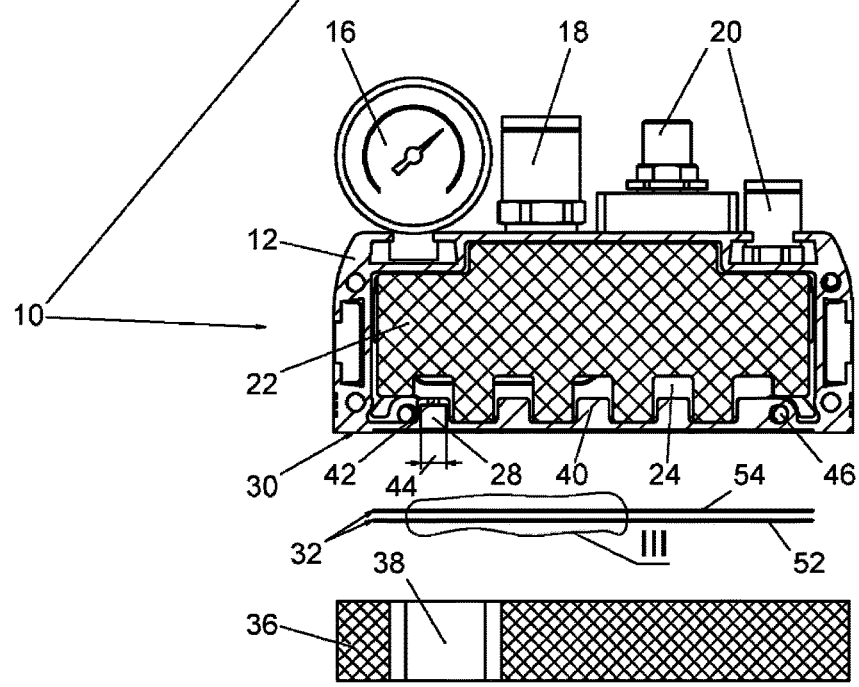
FIG. 2 is a cross-section through the surface area vacuum gripper.

As can be seen in FIG. 2, a film 32 can be placed on the base 26 and within the edge 30, which is flush with the edge 30 at its undersurface, for example. The base 26 can also be designed without an edge. The film 32 has flow openings 34, which correspond spatially to the suction openings 28. The closure of the surface area vacuum gripper 10 on the undersurface thereof forms a flexible lining 36, having a foam rubber mat or sealing plate, and/or numerous elastomer suction cups. Numerous slits 38 or general openings are formed in this lining 36, which in turn correspond spatially to the flow openings 34.

Ridges 40 in the base 26 engage with the grooves 24 in the insertion element 22. One or all of the ridges 40 are provided with holes 42, which open into the suction openings 28 from the base 26. The suction openings 28 are circular thereby, and have a suction cross-section 44. For purposes of completeness, it should be mentioned that a pressurized air channel 46 is provided in one of the ridges 40, which is connected to a pressurized air connection 20, and which serves to separate the workpieces that are suctioned thereto.

Figure 3:
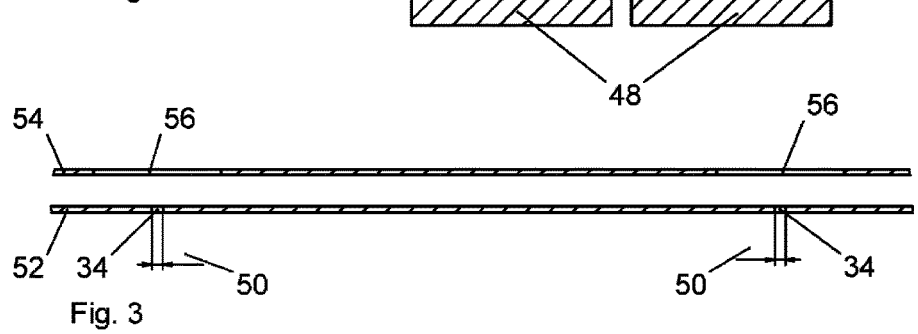
FIG. 3 is an enlarged reproduction of the section III of the film according to FIG. 2.

As is visible in FIG. 3, the film has flow openings 34, having a flow cross-section 50, which determine the air volume suctioned thereto, because the flow cross-section 50 is smaller than the suction cross-section 44. In the depicted embodiment, the film 32 has flow openings 34 disposed in three rows, although there are five ridges 40 having suction openings 38. The suction behavior of the surface area vacuum gripper 10 can thus be adjusted by use of the film 32. Another embodiment of the film 32 provides for five rows having flow openings 34. The film 32 comprises a functional layer 52 as well as an attachment layer 54, which faces the base 26 of the housing 12 or another adhesive layer. The functional layer 52 is composed thereby of a relatively stiff plastic material or a sheet metal, carbon fiber reinforced plastic, glass, or ceramic, and the attachment layer 54 is composed of an adhesive layer. The flow openings 56 in the attachment layer 54 are larger than or the same size as the flow openings 34 in the functional layer 52 thereby, and larger than the suction openings 28 in the base 26.

The flexible lining 36 is attached to the functional layer 52 via suitable mechanism, e.g. likewise an adhesive film or suchlike, wherein the slits 38 correspond to the flow openings 34.

Because the clear flow cross-section 40 of the flow opening 34 in the film 32 is smaller than the suction cross-section 44 in the hole 42, valve bodies, e.g. valve balls or suchlike, can be placed in the holes 42, by which a flow control valve is formed. The valve bodies are retained in the hole 42 by the film 32, because they cannot pass through the flow opening 34. The housing 12 can thus be equipped with valve bodies relatively easily and quickly, and the individual flow control valves can be closed by gluing the film 32 thereto. Furthermore, it can be easily understood that the surface area vacuum gripper 10 can be quickly adapted to other workpieces 48 as a result, in that the film 32 is replaced with another film, thus altering the application purpose.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A surface area vacuum gripper for suctioning and manipulating workpieces, said gripper comprising a housing having a vacuum chamber that can be subjected to a vacuum, a suction surface and suction openings on said suction surface facing the workpiece, a valve body, in particular a valve ball, a vane element, or a membrane valve of a flow control valve is disposed in the suction openings, said suction openings having a cross-section, wherein a flexible lining is allocated to said suction surface, which is applied to the workpiece, wherein a replaceable film is inserted between the suction surface of the housing and the flexible lining such that the film forms a part of the flow control valve, the valve insert, or a regulating valve, and the film has flow openings corresponding spatially to the suction openings, wherein the cross-section area of the flow openings is smaller than the cross-section area of the suction openings, and wherein the overall flow resistance for an air flow through a suction opening and the corresponding flow opening is determined by the flow cross-section of the flow opening in the film.

2. The surface area vacuum gripper as set forth in claim 1, wherein the suction openings and the flow openings lie such that they are coaxial to one another.

3. The surface area vacuum gripper as set forth in claim 1, wherein the flow opening has a flow cross-section that is not circular.

4. The surface area vacuum gripper as set forth in claim 1, wherein the suction openings or the flow openings or the suction openings and the flow openings have a circular cross-section.

5. The surface area vacuum gripper as set forth in claim 1, wherein the film is glued to the housing, or is attached thereto by adhesive, mechanically, or magnetically.

6. The surface area vacuum gripper as set forth in claim 1, wherein the film has a two- or multi-layer construction, and has a functional layer and an attachment layer.

7. The surface area vacuum gripper as set forth in claim 6, wherein the attachment layer has openings corresponding to the flow openings, such that the flow openings lie in the clear openings thereof.

8. The surface area vacuum gripper as set forth in claim 6, wherein the functional layer is made of an air permeable material, e.g. an open porous or open-cell foam rubber, e.g. polyurethane.

9. The surface area vacuum gripper as set forth in claim 8, wherein the attachment layer has openings, but the functional layer has no discreet openings.

10. The surface area vacuum gripper as set forth in claim 1, wherein the film has flow openings, in which an elastic tongue is located in the flow cross-section thereof.

11. The surface area vacuum gripper as set forth in claim 10, wherein the tongue functions as a valve platelet for the suction opening.

12. The surface area vacuum gripper as set forth in claim 1, wherein the entire film, or at least one layer thereof, is composed of metal, carbon fiber reinforced plastic, ceramic, or plastic.

13. The surface area vacuum gripper as set forth in claim 1, wherein the film is designed as a quick replacement film, in particular having positioning aids.

* * * * *